(12) United States Patent
Hanganu et al.

(10) Patent No.: US 10,203,161 B2
(45) Date of Patent: Feb. 12, 2019

(54) CONDENSER-EVAPORATOR TUBE

(71) Applicant: WGA WATER GLOBAL ACCESS, S.L., Sispony (AD)

(72) Inventors: Dan Alexandru Hanganu, Barcelona (ES); Juan Eusebio Nomen Calvet, L'Aldosa (AD)

(73) Assignee: WGA WATER GLOBAL ACCESS, S.L., Sispony (AD)

( * ) Notice: Subject to any disclaimer, the term of this patent is extended or adjusted under 35 U.S.C. 154(b) by 0 days.

(21) Appl. No.: 15/568,682

(22) PCT Filed: Apr. 23, 2015

(86) PCT No.: PCT/ES2015/070344
§ 371 (c)(1),
(2) Date: Oct. 23, 2017

(87) PCT Pub. No.: WO2016/170200
PCT Pub. Date: Oct. 27, 2016

(65) Prior Publication Data
US 2018/0142958 A1 May 24, 2018

(51) Int. Cl.
*F28D 3/02* (2006.01)
*B01D 47/05* (2006.01)
*F25B 39/02* (2006.01)
*F25B 39/04* (2006.01)

(52) U.S. Cl.
CPC ............... *F28D 3/02* (2013.01); *B01D 47/05* (2013.01); *F25B 39/022* (2013.01); *F25B 39/04* (2013.01)

(58) Field of Classification Search
CPC .. F28D 3/02; F28D 3/00; F25B 39/022; F25B 39/04; B01D 61/364; B01D 61/362
See application file for complete search history.

(56) References Cited

U.S. PATENT DOCUMENTS

| 3,844,342 A | 10/1974 | Eninger et al. | |
| 4,422,501 A * | 12/1983 | Franklin | F28D 15/04 165/104.23 |
| 4,470,451 A * | 9/1984 | Alario | F28D 15/0233 122/366 |

(Continued)

FOREIGN PATENT DOCUMENTS

CN 2854484 Y 1/2007

OTHER PUBLICATIONS

International Search Report dated Dec. 14, 2015 in International Patent Application No. PCT/ES2015/070344.

(Continued)

*Primary Examiner* — Emmanuel Duke
(74) *Attorney, Agent, or Firm* — Michele V. Frank; Venable LLP

(57) ABSTRACT

Condenser-evaporator tube, in whose interior flows a vapor to be condensed and over which flows a liquid to be evaporated, where both inside and outside faces of this tube are covered with capillary structures configured for the formation of liquid menisci having a contact angle smaller than 90° where the liquid-vapor interface curves, which allows capillary condensation inside the tube and evaporation on the outside face at the upper end (25) of the liquid menisci where the liquid layer is thinnest and the evaporation most efficient.

11 Claims, 10 Drawing Sheets

(56) References Cited

U.S. PATENT DOCUMENTS

| | | | |
|---|---|---|---|
| 4,807,697 A * | 2/1989 | Gernert | F28D 15/0233 |
| | | | 122/366 |
| 5,219,021 A | 6/1993 | Edelstein et al. | |
| 5,335,720 A | 8/1994 | Ogushi et al. | |
| 2010/0180765 A1 | 7/2010 | Son et al. | |
| 2012/0240563 A1 | 9/2012 | Judkins et al. | |

OTHER PUBLICATIONS

Written Opinion dated Dec. 14, 2015 in International Patent Application No. PCT/ES2015/070344.

\* cited by examiner

CONDENSER-EVAPORATOR TUBE

FIELD OF THE DISCLOSURE

This invention relates to a tube that acts as condenser on its inside face and as evaporator on its outside face, with a high capacity of thermal energy transfer per surface unit and Celsius degree of temperature difference between said faces, usable in shell and tubes devices or other distillation devices.

BACKGROUND OF THE INVENTION

The technical problem to solve is that the tubes that act as condenser on their inside face and as evaporators on their outside face, such as the horizontal tubes of a shell and tubes heat exchanger, reach low heat transfer coefficients per square meter of tube surface and Celsius degree of temperature differential between the vapor that flows inside the tube and the liquid fluid evaporating on the outside surface of the tube.

In the specific case of shell and tubes exchangers for water desalination as used in MultiEffect Distillators MED, the thermal transfer coefficient of the horizontal tubes of these devices is below 3500 watts per square meter and per Celsius degree of temperature difference between the two faces of the tubes.

This limitation of the transmitted energy through the walls of current evaporator-condenser tubes restricts the number of condensation-evaporation cycles that may be realized with a source of energy at a given temperature, for example the steam from a cogeneration plant and a heat sink of lower temperature such as seawater, requires greater surfaces of exchange tubes inside the distillation devices and limits the total energy that may be managed by each distillation device.

BRIEF SUMMARY OF THE INVENTION

The invention attempts to solve one or more of the problems exposed above through a condenser-evaporator tube as defined in the claims.

In the evaporator-condenser tube, the gas phase of a substance to be condensed flows inside a condenser-evaporator tube and the liquid phase to be evaporated flows on the outside of said tube. The inside surface is covered by an interior capillary surface designed to enable the liquid/vapor interface to bend as a result of the formation of a concave meniscus, with a contact angle smaller than 90°, as this allows capillary condensation at a pressure lower than vapor pressure, and the condensed liquid, product of capillary condensation, is collected in an evacuation channel in the lower part of the inside of the condenser-evaporator tube.

The condenser-evaporator tube includes a feeding channel in the outside upper part of the condenser-evaporator tube adapted to feed the liquid fluid to a capillary structure covering the rest of the outside face of the tube, designed to enable the liquid/vapor interface to bend, as a result of the formation of a concave meniscus, with a contact angle smaller than 90°, so that at the end of the bent interface that constitutes the surface of a liquid meniscus, the liquid displays the lowest possible thickness, allowing the most efficient evaporation with a thermal resistance much lower than thicker liquid films.

The condenser-evaporator tube presents a channel for feeding water to be evaporated on the upper part of its outside face and a channel for water removal inside its condenser face that may be mechanically coupled through a sheet or external wall adapted to form the condenser-evaporator tube.

Moreover, the water-feeding channel may be mechanically coupled to the water removal channel by means of support structures that permit the use of walls for the condenser-evaporator tube that are thinner than the walls of a tube without the support structures. These thinner walls allow a short thermal path between the capillary condensation points on the inside face and the water menisci on the evaporator situated on the outside face of the tube.

The external capillary structure of the condenser-evaporator tube is shaped as micro-indentations, micro-grooves or micro-undulations of a predetermined width and depth.

The external and internal capillary structure of the condenser-evaporator tube form capillary channels of rectangular cross-section on opposite crenellated profiles; such that the meniscus on the outside evaporating side is separated from the contiguous meniscus on the inside condensing side by the thickness of the external sheet of the condenser-evaporator tube.

The external and internal capillary structure of the condenser-evaporator tube form triangular sawtooth capillary channels on opposite crenellated profiles; so that the meniscus on the outside evaporating side is separated from the contiguous meniscus on the inside condensing side by the thickness of the external sheet of the condenser-evaporator tube.

The condenser-evaporator tube may be covered by a layer of sintered metal, mesh or other porous structure to cover the inside face of the condenser-evaporator tube so that capillary condensation forms in the confined spaces inside this porous structure.

The condenser-evaporator tube may be mechanically coupled to a pulsing device in order to generate pulses to the liquid fed to the feeding channel on top of the condenser-evaporator tube, creating periodic overflows of liquid fluid over the outside surface of the condenser-evaporator tube.

A bundle of condenser-evaporator tubes are mechanically joined to form a distillation device.

The condenser-elevator tube displays a high capacity of caloric energy transmission by tube surface unit and Celsius degree of temperature difference between its inside face and its outside face.

BRIEF DESCRIPTION OF THE DRAWINGS

A more detailed explanation of the invention may be found in the following description in combination with the attached Figures.

DESCRIPTION OF AN EMBODIMENT

Figure 14:
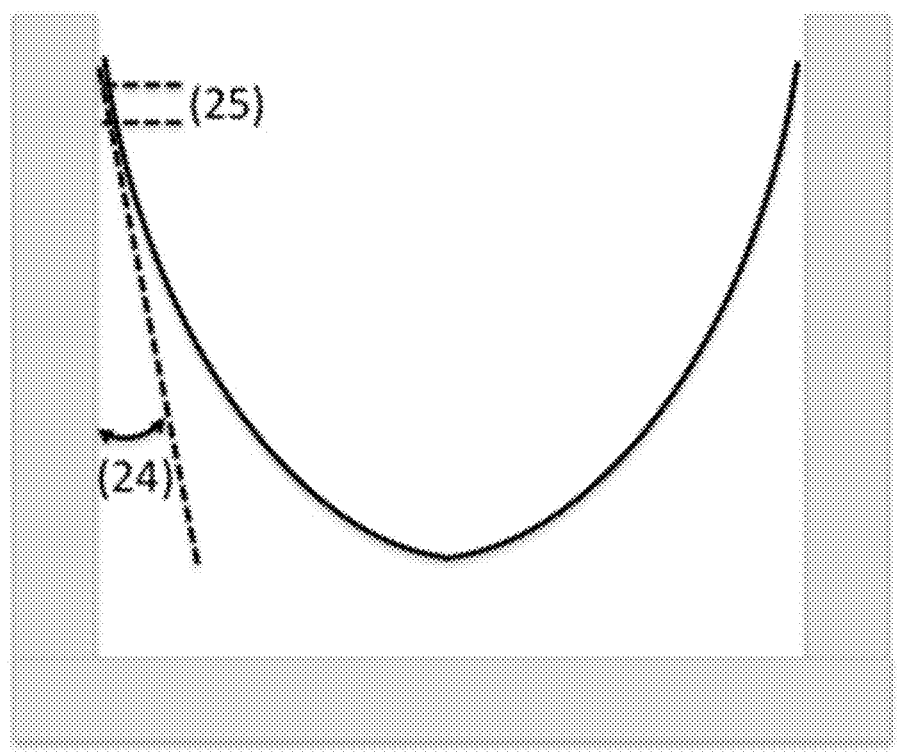
FIG. 14 is a cross-sectional view of the interior of a micro-groove with a concave meniscus of liquid fluid with a contact angle smaller than 90° and the region of the meniscus where the liquid thickness is between 50 nm and 10 microns, which is the area where the most efficient evaporation takes place.
Figure 15:
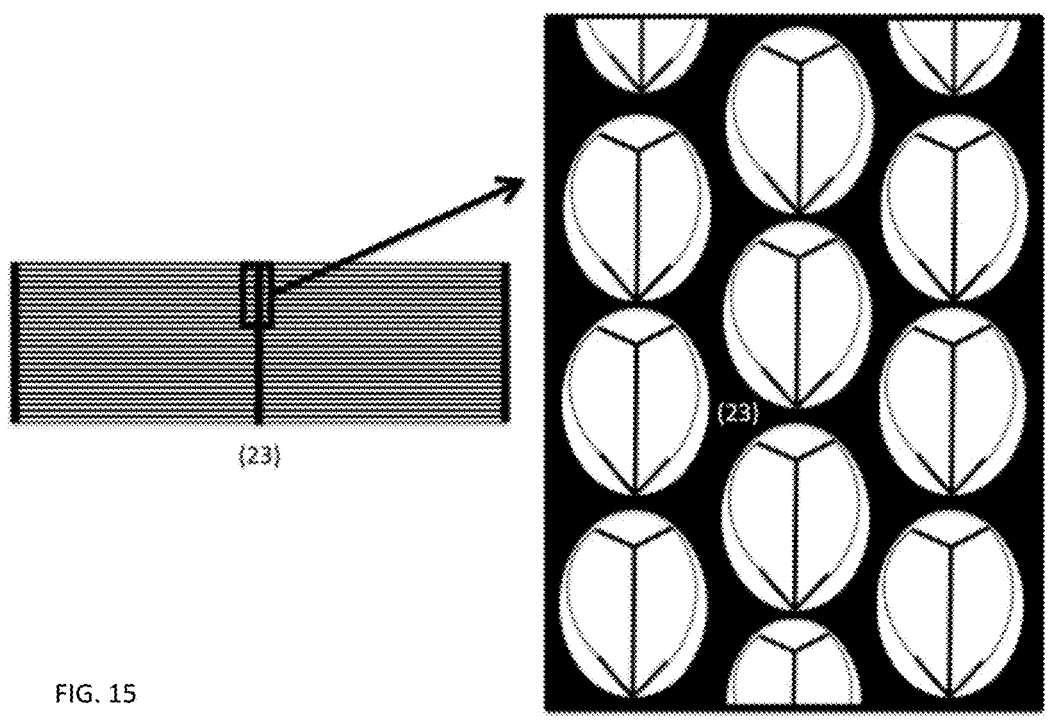
FIG. 15 is a cross-sectional view of a bundle of condenser-evaporator tubes of the shell and tubes distiller device corresponding to the condenser-evaporator tubes depicted in FIG. 10 with a structure that supports the tube bundle.

FIGS. 1 to 4 show a condenser-evaporator tube for evaporating and condensing water solutions or other liquids where the contact angle of the meniscus is smaller than 90°, that works as condenser on its inside face and as evaporator on its outside face; where the inside face is covered with a capillary structure in whose capillary spaces liquid fluid menisci are formed with a curved liquid-vapor interface and where the vapor of the fluid can condense at a pressure lower than vapor pressure and the condensed liquid is discharged through the evacuation channel 2; and where the outside face is covered with a capillary structure where the liquid to be evaporated forms menisci with a curved liquid-vapor interface and the evaporation occurs at the upper end 25, see FIG. 14, of the liquid menisci, where the thinnest liquid layer and the most efficient evaporation occurs.

Figure 11:
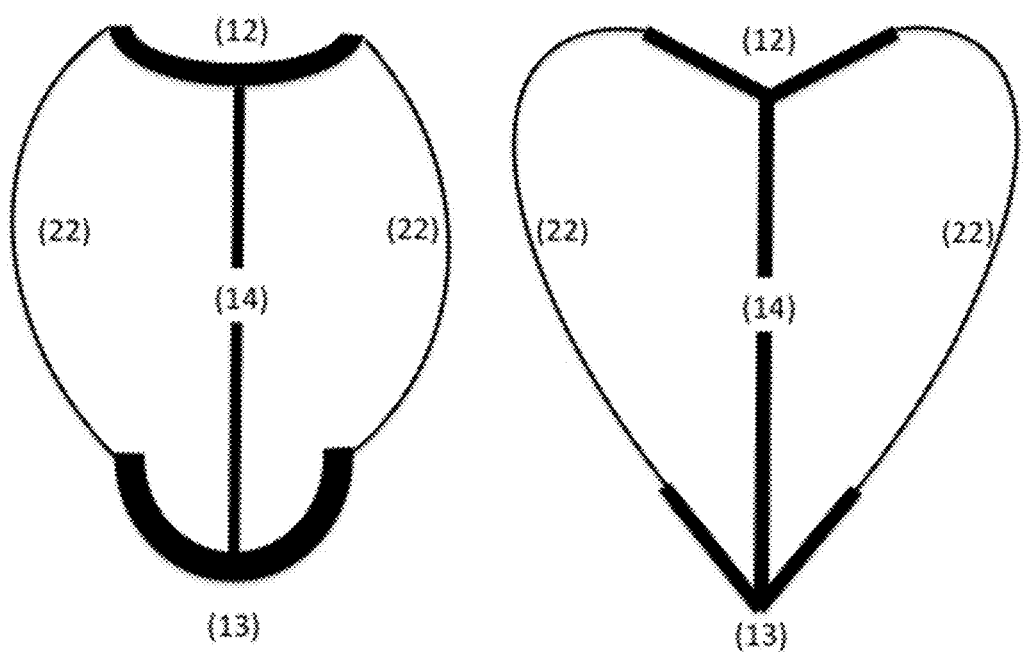
FIG. 11 is a cross-sectional view of two alternative condenser-evaporator tubes with an inside support plate placed between the feeding channel and the evacuation channel inside the condenser-evaporator tube and with sheets or closing walls that join the feeding and evacuation channel on the outside of the condenser-evaporator tube and said sheets or closing walls may be thinner that normal wall tubes as they are not required to withstand structural forces.

According to FIG. 11, the tube may have an internal plate 14 and an external plate 23 for structural support so that the walls 22 that are thermally active may be thinner than those of a tube whose walls need to support structural loads and these walls 22 may adopt different designs that reduce the thermal path between a liquid meniscus inside a micro-groove on the evaporating side and the capillary condensation area on the condensing side.

The condenser-evaporator tube object of this patent may be used in new and specifically designed distiller devices and may be also used to replace the tubes of existing distiller devices as the horizontal tubes of a shell and tubes distillation system, that currently work following the water thin film paradigm, and that substitution permits to keep the large pressure vessels and all the infrastructure surrounding these installations while multiplying at the same time the thermal efficiency of the modified devices.

The condenser-evaporator tube comprises a capillary structure covering its inside condensing face, where liquid menisci with contact angle smaller than 90° and confined inside said capillary structure are formed and the liquid-vapor interface is curved.

The curvature of the liquid-vapor interface on the condensing side implies that the water or another liquid vapor condenses inside a capillary at a pressure lower than its vapor pressure, known phenomenon that obeys Kelvin's law and that facilitates the condensation of the vapor fluid.

In order to avoid the accumulation of the condensed liquid inside the condenser-evaporator tube and prevent the flooding of the capillary structure blocking its capillary condensing capacity the condenser-evaporator includes an evacuation channel 2 placed on the bottom of the condensation-evaporation tube for emptying the liquid from the capillary condensation zone, inhibiting thus the formation of water accumulation that may block the capillary condensation.

The evacuation channel 2 may be omitted sacrificing the lower part of the tube for liquid storage and evacuation, but the addition of the evacuating channel 2 prevents annular flows or other types of flooding of the condensed liquid inside the tube, that may cover the capillary structure of the inside wall, improving thus the ability of the interior face of the tube to function as condenser and improving the thermal properties of the overall device.

The condenser-evaporator tube also includes a capillary structure covering the outside face of the condenser-evaporator tube, where menisci of salt water or other liquid to be evaporated are formed creating a contact angle 24 smaller than 90°, and generating a curved liquid-vapor interface.

The upper part of the liquid meniscus presents a narrow region 25, see FIG. 14, where water presents the lowest film thickness and where the liquid evaporates with great facility due to, among other factors, the existence of a very thin film of water between the metal wall of the capillary structure and the curved liquid-vapor interface that covers the outside part of the meniscus.

To distribute the liquid inside the capillary structure covering the outside of the tube wall, the condenser-evaporator tube includes a feeding channel 4, see FIGS. 1 to 5.

Figure 2:
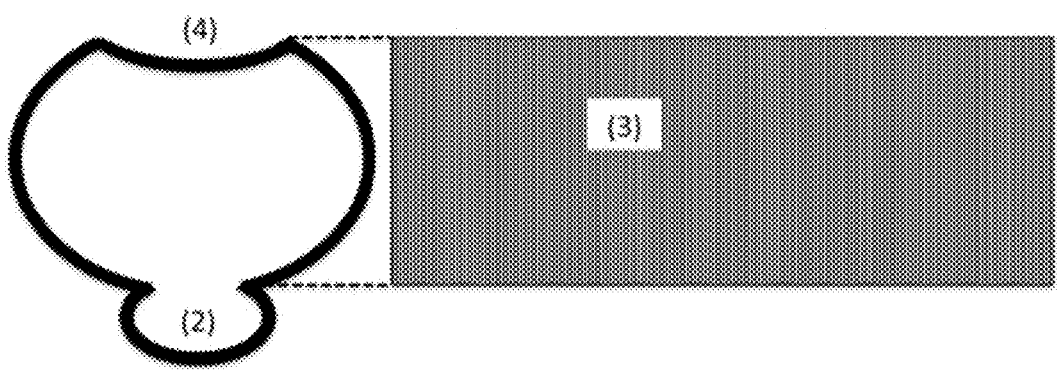
FIG. 2 is a cross-sectional view of the condenser-evaporator tube with a feeding channel for the liquid fluid that flows inside the capillary structure on the outside face of the tube and an evacuation conduct for the condensed liquid inside the condenser-evaporator tube. It also shows the outside wall of the condenser-evaporator tube with a series of micro-grooves, micro-undulations or micro indentations disposed perpendicularly to the axis of the condenser-evaporator tube.
Figure 3:
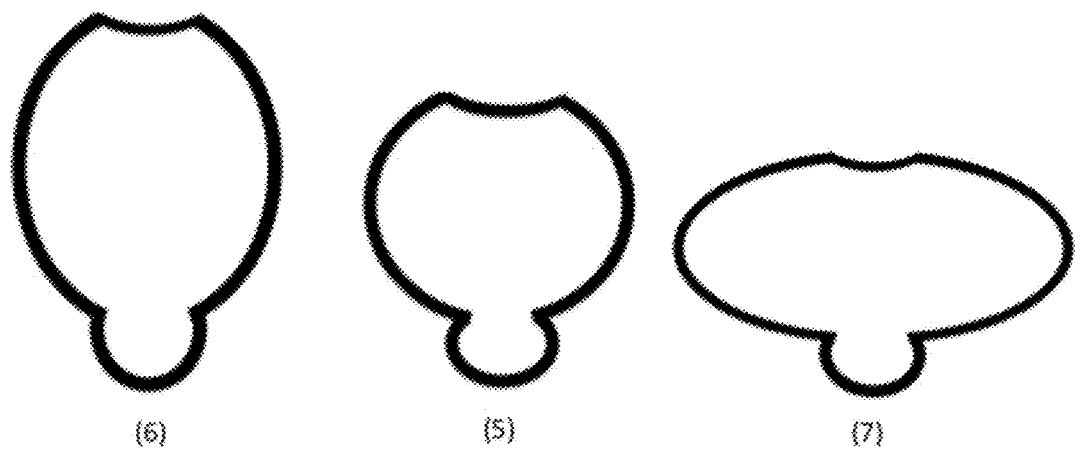
FIG. 3 are alternative cross-sectional views of the condenser-evaporator tube, with circular and oval walls.
Figure 4:
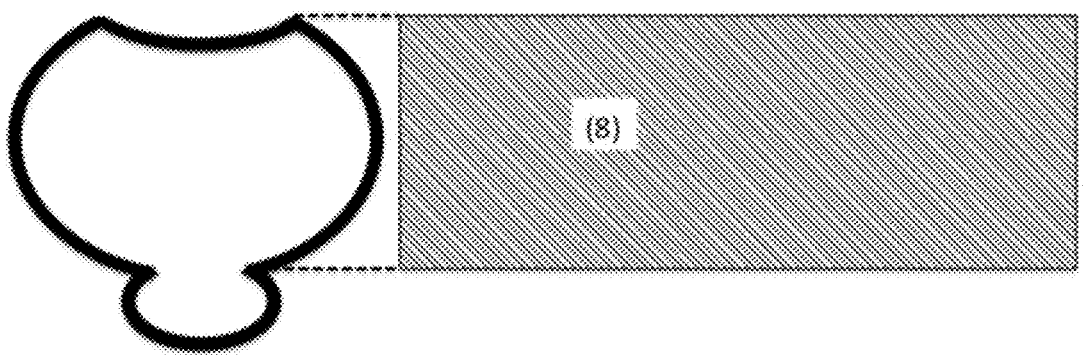
FIG. 4 is a cross-sectional view of an alternative condenser-evaporator tube. It also shows the external face of the wall of the condenser-evaporator tube with a sequence of helical or sloped micro-grooves, micro-indentations or micro-undulations with respect to tube axis.

When the liquid to be evaporated contains organic matter that may form residues or when it is a solution that could favor the formation of solid residues, such as seawater, in order to avoid the formation of solid and organic residues inside covered capillary structures such as a sintered structure that would get clogged, and very difficult to clean, the capillary structure on the outside face of the condenser-evaporator tube is formed of micro-grooves with width and depth smaller than 0.8 mm, perpendicular 3, inclined or helical 8 with respect to the axis of the condenser-evaporator tube, and the micro-grooves extend into the bottom of the feeding channel 4 so that, by capillary tension, water gets into and flows inside the microgrooves, see FIGS. 2 and 4. The liquid inside the feeding channel 4 may be fed by means of periodic pulses created by a pulsing mechanism mechanically coupled to the condenser-evaporator tube, so that the liquid inside the feeding channel 4 overflows periodically forming a liquid film over the outside surface of the condenser-evaporator tube in order to achieve two objectives: dragging the accumulations of residues that may form on the outside surface of the tube and wetting all the outside surface of the tube, preventing the occurrence of dry regions inside the capillary structures of the evaporator.

Figure 6:
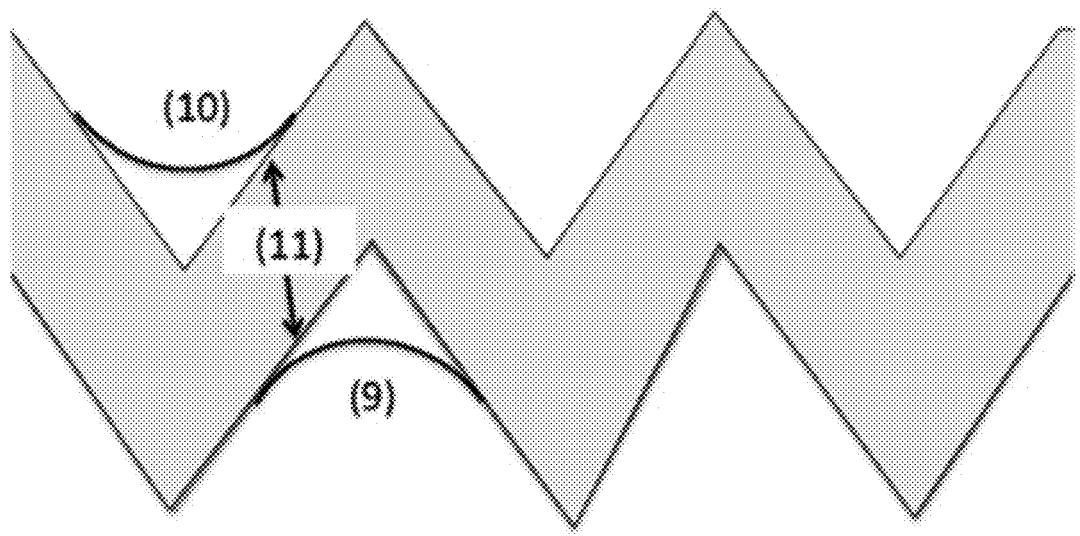
FIG. 6 is a longitudinal cross-sectional view of a wall of a condenser-evaporator tube with micro-grooves on both the inside and the outside faces forming a regular sawtooth profile, such that concave menisci are formed on both faces of the condenser-evaporator tube, so that the meniscus corresponding to the evaporating liquid on the outside face is located at a very short thermal distance from the meniscus formed by the condensing liquid on the inside face of the condenser-evaporator tube.
Figure 7:
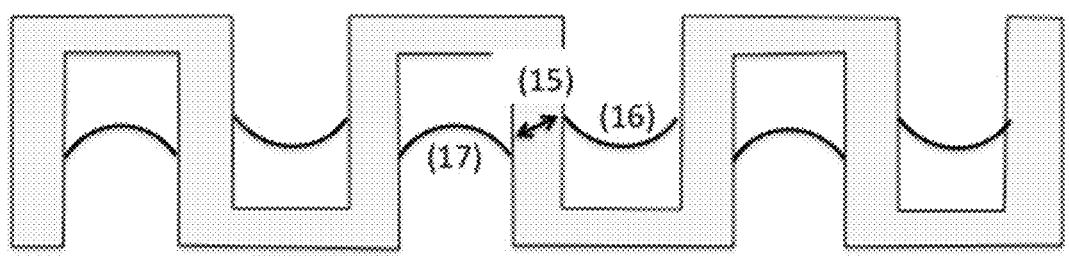
FIG. 7 is a longitudinal cross-sectional view of a wall of a condenser-evaporator tube with micro-grooves on both the inside and outside faces forming a U-shape or crenellated profile, so that the meniscus corresponding to the evaporating liquid on the outside face is located at a very short thermal distance from the meniscus formed by the condensing liquid on the inside face of the condenser-evaporator tube.

The frequency of this flooding is given by the frequency of occurrence of dry zones and the consequent occurrence of solid residues, wherein the pulse frequency depends mainly on the design of the capillary structure that determines the flow rate of the liquid inside the microgroove and on the energy flux of the device. This means that the pulsation rhythm is determined by the design of the distilling device. In agreement with FIGS. 6 to 8, the wall of the condenser-evaporator tube may adopt different profiles such as crenellated, sawtooth, etc. in order to form alternate troughs on both sides of the wall of the condenser-evaporator tube where the liquid-vapor interface covering the upper part of the menisci 9, 10, 16 and 17 is curved so that the thermal paths 11, 15 between the evaporation point and the condensation point are short and correspond to the thickness of the wall of the condenser-evaporator tube.

Figure 13:
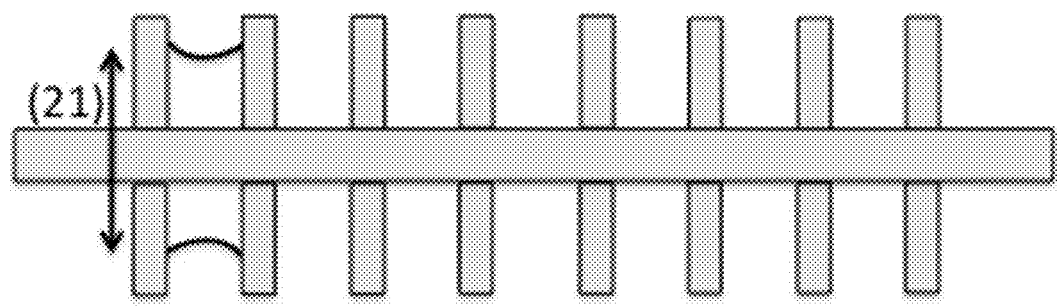
FIG. 13 is a cross-sectional view of a wall of a heat exchange tube with fins where, when used as a condenser-evaporator tube, the meniscus that forms on the outside evaporating face is located at a long thermal distance from the meniscus on the inside condensing face.

The thermal paths 11, 15 are shorter than the thermal path 21 found in a heat exchange tube with micro-fins or other surface extensions in case they are used as a condenser-evaporator tube, as shown in FIG. 13. A heat exchanger that requires maximizing contact surface instead of prioritizing the curving of the liquid-vapor interface by means of a capillary structure where liquid menisci form, as required when the function of the tube is to be an efficient condenser-evaporator.

Figure 10:
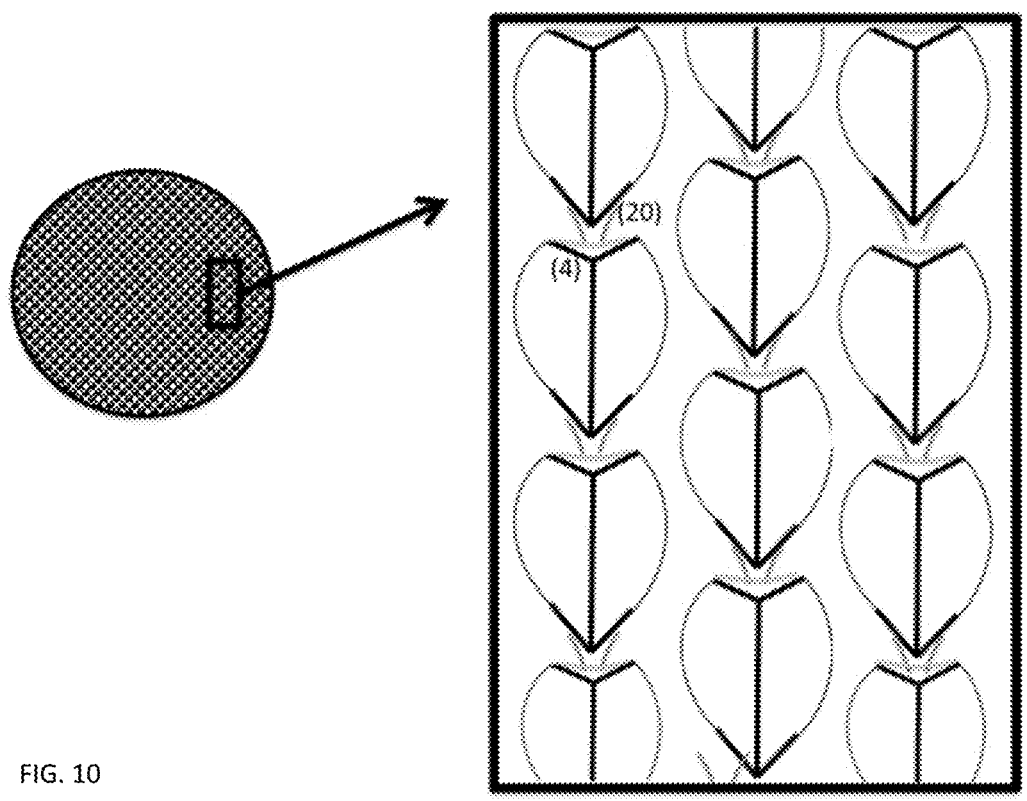
FIG. 10 is a cross-sectional view of a bundle of condenser-evaporator tubes inside a shell and tubes device, where the liquid fluid to be evaporated flows on the outside of the thin walls of the condenser-evaporator tube until flowing over the outside of an evacuation channel and discharging orderly inside the evaporation feeding channel of the next condenser-evaporator tube.
Figure 12:
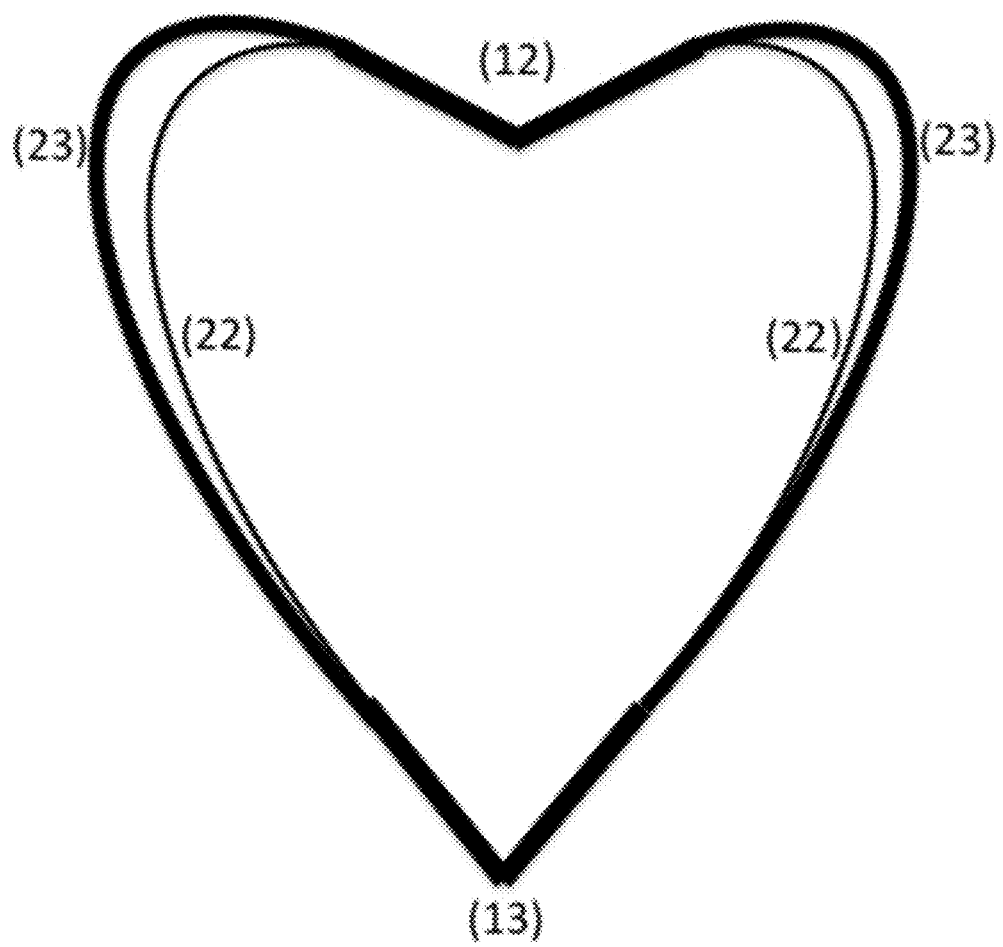
FIG. 12 is a cross-sectional view of a condenser-evaporator tube with a support structure formed by the feeding channel and the evacuation channel mechanically joined by plates external to the condenser-evaporator tube and with sheets or closing walls that are not required to withstand the structural forces of the tube.

In relation to FIGS. 10 to 12, the condenser-evaporator tube includes an internal plate 14 or an external plate 23 that mechanically connect the feed channel 12 to the evacuation channel 13 and a sheet or external wall 22. The internal plate 14 or the external plate 23 are internal or external structures that support the structural forces of the condenser-evaporator tube so designed, so that the external wall 22 has a reduced thickness as it has no mechanical support role. Consequently, the wall of the thermally active tube 22 has a smaller thickness than the thickness of the horizontal tubes of aluminum alloys of the state of the art that currently fluctuates between 1 mm and 0.7 mm, and thus a lower thermal resistance.

As a consequence, we obtain a condenser-evaporator tube with a capillary structure covering its internal wall that allows the curvature of the liquid-vapor interface and the condensation is a capillary condensation duly evacuated by means of an evacuation channel 2 and with a capillary structure on its outside face where the liquid forms menisci with a contact angle smaller than 90° bounded by a curved liquid-vapor interface where the evaporation occurs from the area 25 where the liquid film exhibits its lowest thickness. The wall of the condenser-evaporator tube has a design that places the upper part of a liquid meniscus 16 on the evaporating face in front with the upper part of a meniscus of condensed liquid 17 on the condensing face where capillary condensation occurs, such that the thermal path 15 between the point of evaporation and the point of condensation is also reduced by the reduce thickness of the thermally active wall 22 that rests on an internal or external support structure 14, 23 bearing the structural forces of the condenser-evaporator tube.

The condenser-evaporator tube manufactured with alloys of aluminum, copper or other low thermal resistance metals exceeds, on average, 20,000 watts per square meter and Celsius degree of temperature difference between the two faces of the condenser-evaporator tube and may reach thermal transfer coefficients over 60,000 watts per square meter and Celsius degree of temperature difference and even higher.

Figure 5:
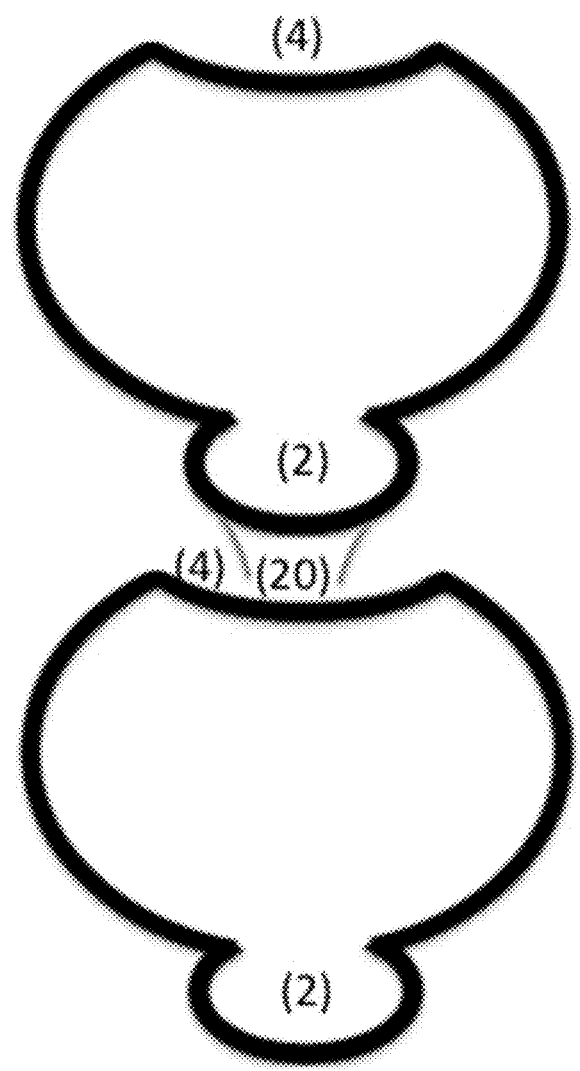
FIG. 5 is a cross-sectional view of two overlaid condenser-evaporator tubes such that the liquid to be evaporated flows from a feeding channel through the capillary structure that covers the outside face of the upper condenser-evaporator tube until discharging the excess feeding liquid inside the feeding channel of the lower condenser-evaporator tube.

Given that the layers of water, or other liquids, thicker than the thin layers formed at the ends 25 of the water menisci, or other liquids menisci, are layers that reduce the energy transfer y hinder the phase change of the fluid, the feeding of liquid on the outside face of the condenser-evaporator tube must be realized in an orderly way, without splattering nor uncontrolled overflows. In order to fulfill this requirement, the condenser-evaporator tubes may be placed in rows, as shown in FIG. 5, so that the liquid flowing over the outside face of the evacuation channel 2, 13 of a condenser-evaporator tube falls inside the feeding channel 4, 12 of the condenser-evaporator tube below.

Figure 1:
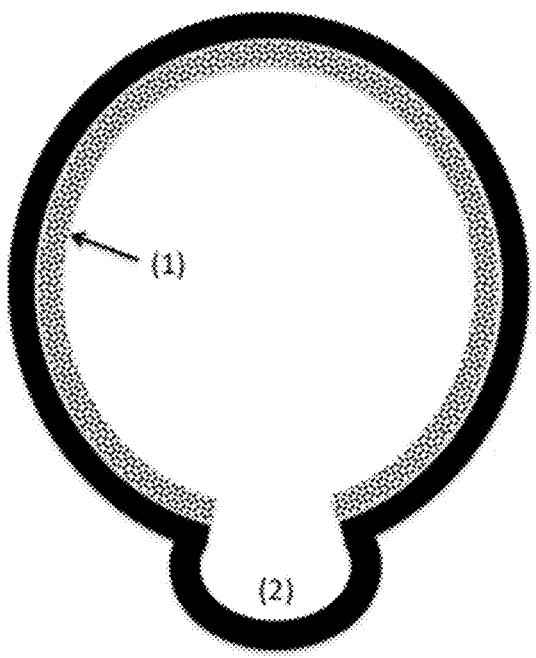
FIG. 1 is a cross-sectional view of the condenser-evaporator tube with sintered metal layer covering the inside face that acts as condenser and a discharge channel for the condensed liquid.
Figure 8:
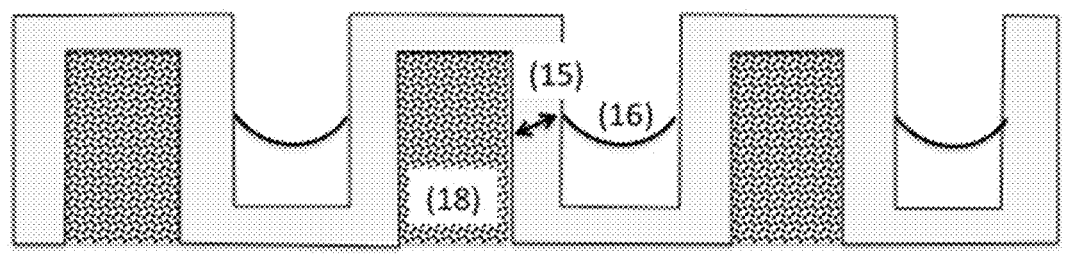
FIG. 8 is a longitudinal cross-sectional view of a wall of a condenser-evaporator tube with micro-grooves on both the inside and outside faces forming a U-shape or crenellated profile, such that concave menisci are formed on both sides of the condenser-evaporator wall, so that the meniscus corresponding to the evaporating liquid fluid on the outside face is located at a very short thermal distance from the meniscus formed by the condensing liquid inside the sintered layer or other porous structure on the inside face of the condenser-evaporator tube.

As shown in FIG. 1 and with greater detail in FIG. 8, the inside face of the condenser-evaporator tube may be lined with a sintered layer, mesh or wick 18 so that the capillary condensation takes place inside the confined spaces within this structure that maintain a short thermal distance 15 from the liquid menisci of the liquid on the evaporating side 16.

The best ratio between volume and exchange surface is achieved with rounded structures, and thus the section of the tube may be round 5 or oval, either elongated 6 or flattened 7.

The substitution of the bundle of tubes of the Multi Effect Distillation devices MED by a bundle of tubes described in this patent permits to multiply the thermal transfer coefficients of these MED plants, obtaining thus better performances.

The substitution of the current horizontal tubes of these desalination facilities with the condenser-evaporator tubes described in this patent permits to use much of the other components of a current multiple effect desalination plant and at the same time permits to multiply the quantity of watts transferred per surface unit of tube and Celsius degree of temperature difference, which leads to the multiplication of the desalination capacity of the facility, the reduction of the necessary temperature difference in each effect and thus the increase of the number of effects, reducing the energy cost per unit of distilled water or multiplying the volume of desalinated water in each effect, or any combination of these possible results.

Figure 9:
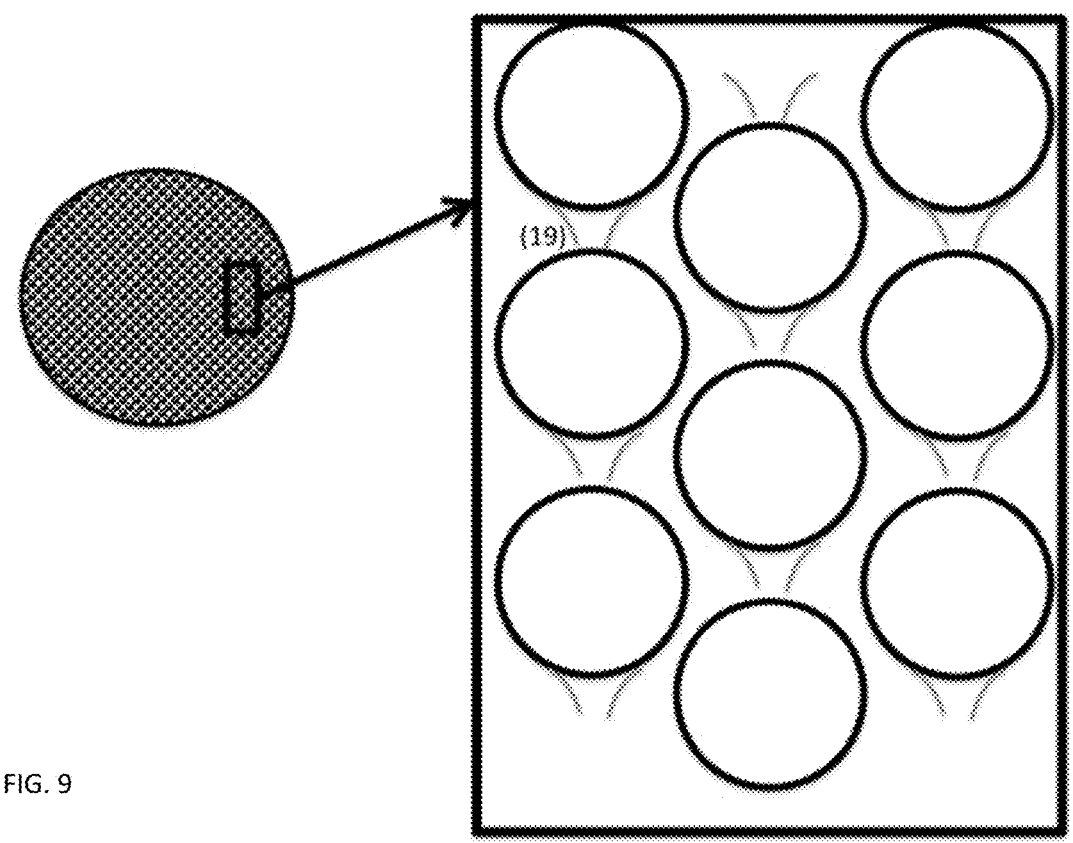
FIG. 9 is a cross-sectional view of a bundle of tubes of a state-of-the-art shell and tubes distiller, where the liquid fluid to be evaporated flows on the outside of the thick walls of condenser-evaporator tubes falling in water film over a condenser-evaporator tube below.

As schematically presented in FIG. 9, with the bundles of horizontal tubes of the state of the art of MED facilities, a water film 19 is poured over the tubes that act as evaporators on the outside and as condensers inside. As schematically presented in FIG. 10, a bundle of condenser-evaporator tubes of the instant invention may substitute the bundles of tubes of the state of the art of a MED facility. FIG. 10 shows how the excess of salted water of a condenser-evaporator tube is poured into the feed channel 4 of the next condenser-evaporator tube that supplies salted water inside the capillary microgrooves covering the outside face of this next condenser-evaporator tube. This bundle of condenser-evaporator tubes is supported by structures 23 that bear the condenser-evaporator tubes.

The invention claimed is:

1. A condenser-evaporator tube, in whose inside face flows a vapor to be condensed and outside face which flows a liquid to be evaporated, wherein both the inside and outside faces of the condenser-evaporator tube are covered with capillary structures configured for formation of liquid menisci having a contact angle smaller than 90° where the liquid-vapor interface curves, which allows capillary condensation inside the tube and evaporation on the outside face at an upper end of the liquid menisci where the liquid layer is thinnest and the evaporation most efficient.

2. The condenser-evaporator tube according to claim 1; further comprises a feeding channel supplying the liquid to be evaporated over the outside face of the tube in which the capillary structure of the outside face penetrates in order to orderly channel the liquid inside the capillary structure.

3. The condenser-evaporator tube according to claim 1; further comprises an evacuation channel located in a lower inner part of the condenser-evaporator tube and through which the liquid condensed in the capillary structures is evacuated.

4. The condenser-evaporator tube according to claim 3; wherein the feeding channel is mechanically coupled to the evacuation channel by means of an external plate adapted for mechanically supporting the condenser-evaporator tube.

5. The condenser-evaporator tube according to claim 4; characterized because the walls that act as condenser inside and evaporator outside are made of low thermal resistance thin metal layer less than 0.7 mm thick.

6. The condenser-evaporator tube according to claim 3; wherein the feeding channel is mechanically coupled to the evacuation channel by means of an internal plate adapted for mechanically supporting the condenser-evaporator tube.

7. The condenser-evaporator tube according to claim 1; wherein the capillary structure on the outside face is in shape of microgrooves or micro undulations of predetermined depths and widths smaller than 0.8 mm.

8. The condenser-evaporator tube according to claim 1; wherein the inside and outside capillary structures of the condenser-evaporator tube form opposed capillary channels of rectangular cross section in a crenellated profile and an evaporating meniscus is separated from a contiguous condensing meniscus by a thermal path corresponding to a thickness of a sheet that constitutes the wall of the condenser-evaporator tube.

9. The condenser-evaporator tube according to claim 8; wherein the inside face of the condenser-evaporator tube is lined with a sintered layer, mesh or other porous structure so that the capillary condensation happens inside the confined spaces within this porous structure.

10. The condenser-evaporator tube according to claim 1; wherein the inside and outside capillary structures of the condenser-evaporator tube form opposed capillary channels of triangular cross section of sawtooth profile and an evaporating meniscus is separated from a contiguous condensing meniscus by a thermal path corresponding to a thickness of a sheet that constitutes the wall of the condenser-evaporator tube.

11. The condenser-evaporator tube according to claim 1; wherein a bundle of evaporator-condenser tubes are mechanically coupled to form a distillation device.

* * * * *